United States Patent [19]

Iwasa

[11] 4,431,337

[45] Feb. 14, 1984

[54] WAVE DISSIPATION CAISSON

[76] Inventor: Nobuhiko Iwasa, 12-21, Motobuto 1-Chome, Urawa-shi 336, Japan

[21] Appl. No.: 336,344

[22] PCT Filed: Apr. 24, 1981

[86] PCT No.: PCT/JP81/00098
§ 371 Date: Dec. 23, 1981
§ 102(e) Date: Dec. 23, 1981

[87] PCT Pub. No.: WO81/03190
PCT Pub. Date: Nov. 12, 1981

[30] Foreign Application Priority Data

May 9, 1980 [JP] Japan ............ 55-62460[U]

[51] Int. Cl.³ .................................. E02B 3/06
[52] U.S. Cl. .............................. 405/30; 405/21; 405/15
[58] Field of Search ............. 405/30, 15, 16, 27, 405/29, 31, 32, 33, 34, 35; 52/308, 606, 608, 609, DIG. 2, 607

[56] References Cited

U.S. PATENT DOCUMENTS

| 627,849 | 6/1899 | Hackett | 52/608 |
| 3,417,533 | 12/1968 | Sparling | 52/607 |
| 3,645,059 | 2/1972 | Grimm | 52/308 |

FOREIGN PATENT DOCUMENTS

| 1224903 | 9/1966 | Fed. Rep. of Germany | 52/DIG. 2 |
| 683360 | 11/1952 | United Kingdom | 405/29 |
| 987271 | 3/1965 | United Kingdom | 405/30 |
| 1421132 | 1/1976 | United Kingdom | 405/16 |

Primary Examiner—Dennis L. Taylor
Assistant Examiner—John A. Gungor
Attorney, Agent, or Firm—McGlew and Tuttle

[57] ABSTRACT

This is a wave dissipation caisson made of concrete wherein trapezoidal wing pieces having an appropriate number of holes are fixed in combination to the inside of a box-type frame formed only by angled sections of a framework. The caisson has a permeable structure wherein the waves advancing into the frame are shifted and divided by wing pieces so as for the energy of the waves to be dissipated and is placed on a seabed to be utilized as a revetment and a breakwater.

5 Claims, 2 Drawing Figures

4,431,337

WAVE DISSIPATION CAISSON

DESCRIPTION

FIELD AND BACKGROUND OF THE INVENTION

This invention relates to a permeable wave dissipation caisson made mainly of concrete and placed on a seabed to dissipate the energy of waves passing therethrough.

Wave dissipation has been achieved thus far by using tetrapods or concrete blocks. This method has the disadvantage that the tetrapods or concrete blocks used are moved by the energy of the waves or that a multitude of such units are required for preventing such movement. This results in the increased cost therefor.

Moreover, obstruction of the movement of waves by the blocks prevents the alternating flow of seawater through the blocks, which causes corruption of the seawater.

It is true that there have been blocks having permeable structure, but they are built only of beams stretched in the shape of a box with walls inside and, therefore, there is the possibility that they may be turned round by the energy of the waves. Furthermore, the place wherein the blocks are set is dug deep by the waves, which makes a caisson unstable. The present invention is intended to provide a stable wave dissipation caisson which is not moved by the energy of the waves.

In addition, the present invention has the purpose of providing a caisson which not only improves the alternating flow of seawater therethrough but also can be utilized as a fishing rock owing to its permeable structure.

Furthermore, the present invention is intended to provide a caisson which can be piled one atop the other due to its box-shaped structure.

SUMMARY OF THE INVENTION

According to the present invention, two trapezoidal or triangular wing pieces having an appropriate number of holes are arranged with each bottom side thereof diverging, the top sides thereof are opposed and joined to each other to form a wing body, two sets of wing bodies thus formed are further joined to each other with opposed top parts thereof being made to face each other and turned round at an angle of 90 degrees to each other, and a structure thus constituted is housed in a bookcase-shaped frame whose bottom surface wall has an appropriate number of holes and whose upper part is formed only by angled sections of a framework, and afterwards the diverging bottom side of each wing piece is fixed to each angled section of the framework of the frame.

By this constitution, the waves advancing in between the diverging bottom sides of the wing body housed in the frame (as shown by an arrow in FIG. 1) are shifted and divided in the vertical direction A by a vertical space and in the horizontal direction B by openings provided in the wing body and are further broken up vertically and horizontally by the rear wing body joined to the front wing body with a turn at an angle of 90 degrees. Thus, the waves are broken up and made turbulent in the caisson and thereby the energy of the waves is scattered and dissipated completely.

Moreover, the holes made in the bottom absorb the energy of the waves, whereby the possibility of the caisson being upset by the waves is eliminated. In addition, the existence of the bottom in addition to the holes prevents the waves from penetrating into the place wherein the caisson is installed and from digging up the seabed at this place, whereby the stability of the installed caisson can be maintained. Furthermore, since the caisson has a permeable structure and, in addition, each wing piece is provided with holes, the ratio of a space inside the caisson is high and this makes the caisson inhabitable for fish and shellfish. Therefore, the caisson may also be utilized as a fishing rock.

In addition to the aforesaid effects, the permeable structure and the existence of holes in each wing piece in the caisson which has a volume of 4–500 m$^3$ usually make it possible to reduce the quantity of concrete to be employed and thus the cost therefor.

Further, the caisson in the present invention does not obstruct the alternating flow of seawater through the caisson, whereby the corruption of the seawater at the back of the caisson is prevented. Moreover, the condition of the box-type caisson makes it easy to pile it up, and thus stable piling thereof can be assured.

BRIEF DESCRIPTION OF THE DRAWINGS

FIG. 1 is a perspective view of the wave dissipation caisson which is an embodiment of the present invention, while

BEST MODE FOR CARRYING OUT THE INVENTION

For the purpose of a more detailed description of the present invention, further explanation is made hereunder in accordance with the attached drawings.

Figure 1:
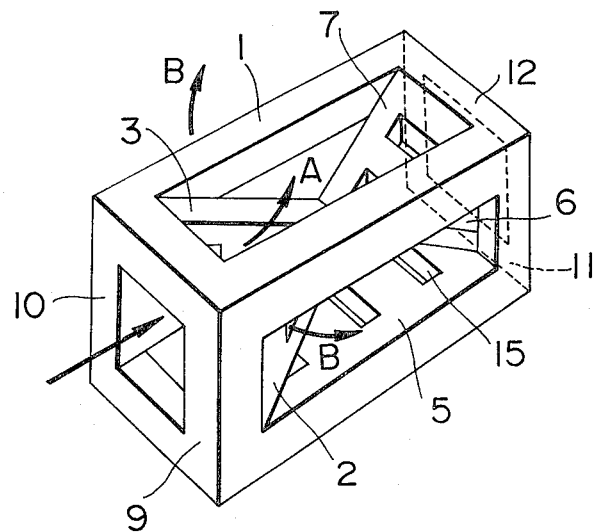

FIG. 1 is to show an embodiment of the wave dissipation caisson in the present invention, which is made of concrete.

Figure 2:
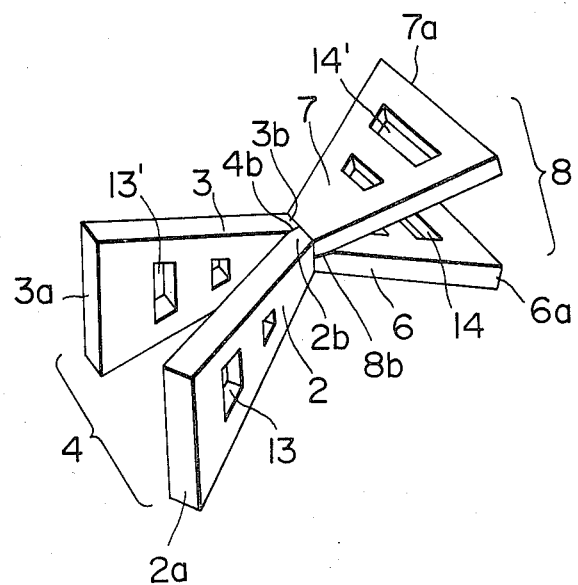
FIG. 2 is a perspective view of the structure of the junction of two sets of wing bodies housed in the wave dissipation caisson.

The box-type frame 1 is a frame wherein no closed sides or upper wall are provided but only a bottom surface wall 5 is provided. The other parts thereof are constituted only by angled sections of a framework. Inside the frame, a set of two trapezoidal wing pieces 2 and 3 are arranged with the layer bottom sides or edges 2a and 3a thereof being expanded or diverging as shown in FIG. 2. The smaller top sides or edges 2b and 3b of the wing pieces are made to face each other and are joined to form a wing body 4, while, on the other side, the top sides of two trapezoidal wing pieces 6 and 7 are also made to face each other in the same fashion and joined to form the other wing body 8. The top parts 4b and 8b of the two wing bodies 4 and 8 are opposed and joined to each other in their shown positions with a turn at an angle of 90 degrees to each other, and a structure thus constituted is housed in and fixed to the frame.

The fixation is made in such a manner that the bottom sides of each wing body are fixed to the respective angled sections of the framework, that is, the bottom sides 2a and 3a of the wing body 4 are fixed to the angled sections or frame members 9 and 10 of the framework and the bottom sides 6a and 7a of the other wing body 8 to the horizontal angled sections or frame members 11 and 12 thereof. Frame member 11 is formed by one edge of wall 5. In each of the wing pieces 2, 3, 6 and 7 and in the bottom surface 5 are provided an appropriate numbers of holes 13, 13', 14, 14' and 15, respectively.

The frame 1 is thus formed by the bottom wall 5 having a plurality of openings 15 therein, which bottom wall has a front edge over which water flows in the direction of the straight arrow in FIG. 1, a rear edge 11, and side edges. The frame includes vertical frame members which extend upwardly and are connected by horizontal frame members to form the open side and top of the frame.

The industrial applicability of the wave dissipation caisson involved in the present invention is that it is fitted for use as a breakwater, a revetment or a pier in a harbor, on a coast and in a river, as well as for use as a fishing rock which is inhabitable by fish.

What is claimed is:

1. A wave dissipation caisson comprising:
   a frame having a bottom wall adapted to rest on the floor of a body of water, said bottom wall having a plurality of openings therethrough, said frame including a plurality of vertical frame members extending upwardly from said bottom wall and a plurality of horizontal frame members connected to said vertical frame members to form open sides and an open top of said frame;
   a first pair of trapezoidal wing pieces each having a large edge and a small edge, said first pair of trapezoidal wing pieces connected to each other at said small edges thereof and diverging outwardly toward said large edges thereof; and
   a second pair of trapezoidal wing pieces each having a large edge and small edge, said second pair of trapezoidal wing pieces connected to each other at said small edges thereof and diverging outwardly toward said large edges thereof;
   each of said wing pieces having a plurality of openings therein with said first and second pair of trapezoidal pieces connected to each other at said connected small edges thereof with said first pair of trapezoidal wing pieces rotated by 90° with respect to said second pair of trapezoidal wing pieces;
   said connected first and second pair of trapezoidal wing pieces connected into said frame with each large edge of said first pair of trapezoidal wing pieces connected to and extending along one of said vertical frame members on one side of said bottom wall, one of said large edges of said second pair of trapezoidal wing pieces connected to and extending along one of said horizontal frame members on an opposite side of said bottom wall, and the other of said large edges of said second pair of trapezoidal wing pieces connected to and extending along an edge of said bottom wall at said opposite side of said bottom wall.

2. A wing dissipation caisson according to claim 1, wherein said frame includes four vertical frame members and four horizontal frame members to form a rectangular frame, an open side of said frame adjacent said one side of said bottom wall defining a front of said caisson for receiving incoming waves which are dispersed and deflected upwardly through said open top of said frame and between said first pair of trapezoidal wing pieces, and sideways through two of said open sides through said apertures of said first pair of trapezoidal wing pieces.

3. A wave dissipation caisson according to claim 1, wherein said bottom wall includes three openings and each of said trapezoidal wing pieces of said first and second pair of trapezoidal wing pieces includes two openings.

4. A method of dissipating a wave moving in a body of water comprising:
   providing a caisson which comprises, a frame having a bottom wall adapted to rest on a floor of the body of water, said bottom wall having a plurality of openings therethrough, said frame including a plurality of vertical frame members extending upwardly from said bottom wall and a plurality of horizontal frame members connected to said vertical frame members to form open sides and an open top of said frame; a first pair of trapezoidal wing pieces each having a large edge and a small edge, said first pair of trapezoidal wing pieces connected to each other at said small edges thereof and diverging outwardly toward said large edges thereof; and a second pair of trapezoidal wing pieces each having a large edge and a small edge, said second pair of trapezoidal wing pieces connected to each other at said small edges thereof and diverging outwardly toward said large edges thereof; each of said wing pieces having a plurality of openings therein with said first and second pair of trapezoidal pieces connected to each other at said connected small edges thereof with said first pair of trapezoidal wing pieces rotated by 90° with respect to said second pair of trapezoidal wing pieces; said connected first and second pair of trapezoidal wing pieces connected into said frame with each large edge of said first pair of trapezoidal wing pieces connected to and extending along one of said vertical frame members on one side of said bottom wall, one of said large edges of said second pair of trapezoidal wing pieces connected to and extending along one of said horizontal frame members on an opposite side of said bottom wall, and the other of said large edges of said second pair of trapezoidal wing pieces connected to and extending along an edge of said bottom wall at said opposite side of said bottom wall; and
   positioning said caisson in the body of water with said bottom wall thereof resting on the floor of the body of water.

5. A method according to claim 4, including positioning said caisson in the body of water with said first pair of trapezoidal wing pieces facing a direction for receiving the wave as it moves in the body of water.

* * * * *